July 31, 1951 V. PETR, JR 2,562,388
BLOWER

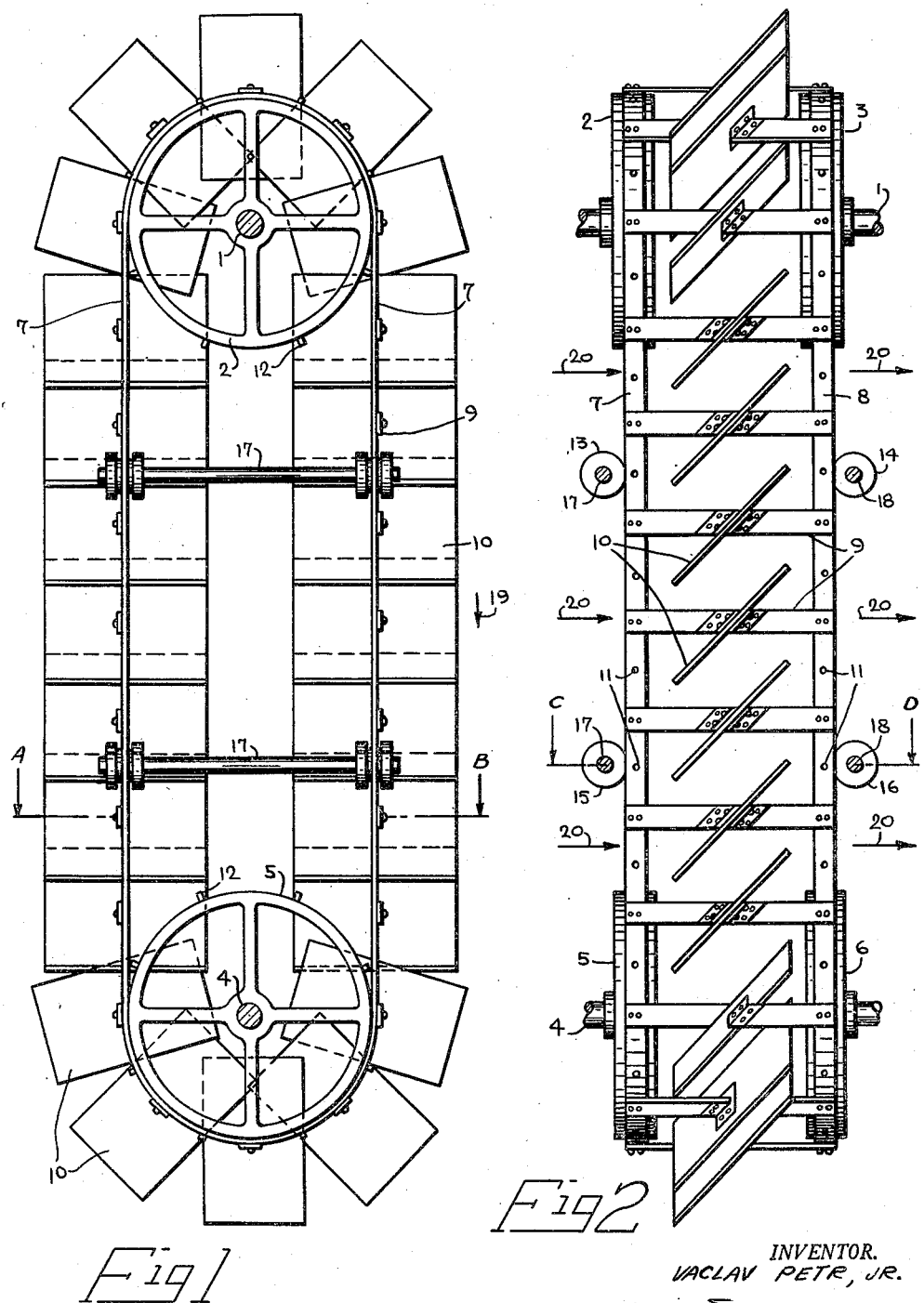

Filed Feb. 25, 1948 2 Sheets-Sheet 2

INVENTOR.
VACLAV PETR JR.
BY
ATTORNEY

UNITED STATES PATENT OFFICE 2,562,388

BLOWER

Vaclav Petr, Jr., Brunn, Czechoslovakia

Application February 25, 1948, Serial No. 10,829
In Yugoslavia December 3, 1939

2 Claims. (Cl. 230—240)

This invention relates to a blower and particularly to an air blower.

In many branches of industrial activities, for instance, in flour milling plants the necessity arises to remove from the pulverulent masses under treatment undesired components and contaminating substances which have a lighter weight than the masses.

The latter are for this purpose frequently spread on screens which are exposed to air currents generally produced by blowers; these air streams remove the contaminating lighter components.

Difficulties have been encountered when using customary blowers insofar as the air streams do not reach the entire area of the spread materials simultaneously.

Therefore it has become a rule to operatively couple the blowers with certain additional equipment to remedy this deficiency. Nevertheless, a satisfactory separation of the contaminating lighter particles from the pulverulent materials could not be achieved.

It is the object of this invention to provide an air blower which eliminates the above recited shortcomings of the known blower constructions and serves to greatly accelerate the purification of pulverulent masses.

This blower forming the subject matter of the invention will now be described in detail and with reference to the accompanying drawing.

In the drawing,

Fig. 1 is a vertical side elevation of the blower shown in Fig. 2,

Fig. 2 is a vertical side elevation of the blower shown in Fig. 1,

Figure 3:
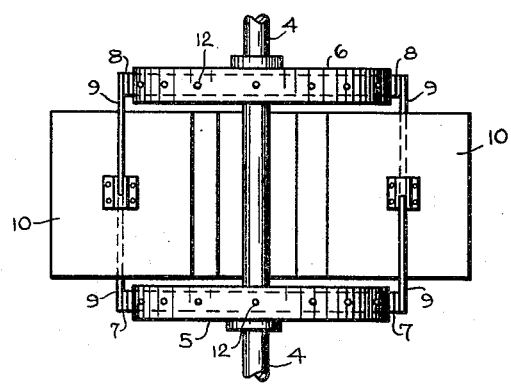
Fig. 3 is a sectional view on line A to B of Fig. 2.
Figure 4:
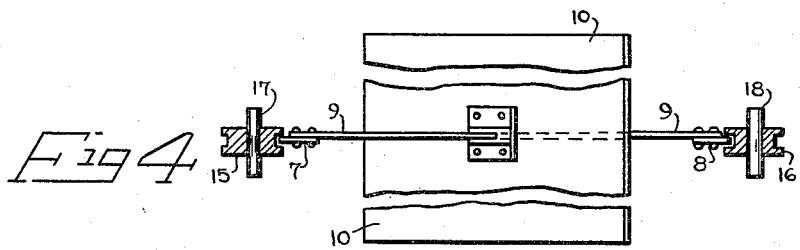
Fig. 4 is a sectional view on line C to D of Fig. 2.

The blower shown in the drawing is mainly composed of two uniform endless belts 7, 8 preferably made of steel; these belts are adjacently arranged and carried on two identical pairs of wheels 2, 3 and 5, 6.

These wheels are rotatably supported on suitably mounted shafts 1, 4 one of which is driven.

Equidistant parallel transverse ledges 9 fastened to the outside of the belts bridge and connect the same. Blades 10 are fastened to these ledges; the blades are inclined at a uniform angle relative to the plane through which the shafts 1, 4 extend or relative to the longitudinal extension of the belts.

In order to secure a smooth uniform travel of the two steel belts 7, 8 the latter are provided with equidistant orifices 11 and the wheels 2, 3, 5, 6 with equidistant projections 12 which cooperate with the orifices.

The belts are guided by lateral discs 13, 14, 15, 16 mounted on the shafts 17, 18; this is particularly useful if belts of a considerable length are used. The number of the guiding discs may vary in conformity with the length of the blower.

Figure 5:
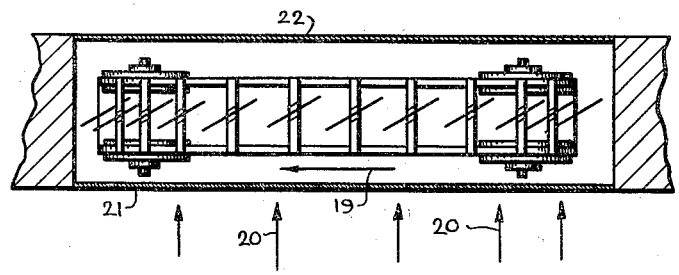
Fig. 5 is a schematic side view of the blower mounted in the recess of a wall.

The blower is generally mounted above a screen upon which the means to be purified are spread; this arrangement is shown in Fig. 5. The blower is propelled in the direction of arrows 19, see Figs. 1 and 5. The inclined blades produce an air current which is uniformly distributed on the entire screen area; this air current sucks the lighter components from the pulverulent masses spread on screen 21 and expells the same through the upper screen 22.

The blower constructed in conformity with this invention has been described in its application to the uniform removal from large areas; however, its use is by no means restricted thereto; it may, for instance, be also used for the ventilation of large spaces, such as concert, theatre and similar large halls.

What I claim is:

1. An air blower comprising two adjacent parallel endless belts, two pairs of wheels to rotatably support said belts, two shafts of which one is driven extending through the same plane to support said pairs of wheels, equidistant orifices in said belts and equidistant projections on said wheels, to propel said belts over said wheels, transverse equidistant ledges bridging the said two belts, blades attached to said ledges, said blades being inclined at the same angle relative to a plane extending through said shafts.

2. An air blower comprising two adjacent parallel endless belts, two pairs of wheels to rotatably support said belts, two shafts of which one is driven extending through the same plane to support said pairs of wheels transverse equidistant ledges bridging the said two belts, blades attached to said ledges, said blades being inclined at the same angle relative to a plane extending through said shafts and grooved rollers located in adjacent relationship to said belts to guide the outside edges thereof.

VACLAV PETR, JUNIOR.

REFERENCES CITED

The following references are of record in the file of this patent:

UNITED STATES PATENTS

| Number | Name | Date |
| --- | --- | --- |
| 381,625 | Johnston | Apr. 24, 1888 |
| 676,842 | Ferguson | June 18, 1901 |
| 763,623 | Nance | June 28, 1904 |

FOREIGN PATENTS

| Number | Country | Date |
| --- | --- | --- |
| 264,732 | Italy | May 8, 1929 |